June 27, 1967   L. S. TAYLOR   3,328,002
METHOD AND APPARATUS FOR MIXING FLUIDS
Filed Nov. 4, 1964

INVENTOR.
LLOYD S. TAYLOR
BY
ATTORNEY

United States Patent Office 3,328,002
Patented June 27, 1967

3,328,002
METHOD AND APPARATUS FOR MIXING FLUIDS
Lloyd S. Taylor, 3127 Maple Drive NE.,
Atlanta, Ga. 30305
Filed Nov. 4, 1964, Ser. No. 408,996
17 Claims. (Cl. 259—3)

This invention relates to a method and apparatus for mixing fluids and particularly a device for combining two or more fluids such as the resin and catalyst that form a solid foam within a relatively few seconds after mixing and to the method of combining multiple layers of the liquid material prior to application to the area to be treated.

It is often desirable to make a blend of two or more liquids in a continuous fashion and to apply the blended liquids in a continuous manner so as to cover a given area with a homogeneous mixture. There are instances where due to the inherent nature of the substances being used it is very difficult to blend the materials and apply them within the allotted time and to do this continuously over a long period of time such as in the production of items all day long. Chemicals in the form of a resin and catalyst for making foam plastic materials are well known and this material is being used in numerous places such as a flotation filler in voids in boats as well as an insulating or sound deadening material for cavities in vehicles, building installations and numerous other places. Such chemicals are produced by many leading companies such as Du Pont Chemical, Hercules, and other companies. While the chemicals for the resin and catalyst are relatively inert when stored separately, once combined the reaction is rapid and within a relative few seconds the foam process starts and is virtually uncontrollable until the chemicals have exhausted the forming properties. In addition, if the foam material is allowed to dry on the applicator then it too becomes covered or stopped-up with dry foam material which is exceedingly difficult to remove. If the resin and catalyst are blended through a nozzle-like device, continuous operation must be performed or otherwise the nozzle will become hopelessly clogged with the foam material. This means that in a production operation the feeding of the material must never stop unless the nozzle is cleaned or purged to prevent stoppage. The present apparatus blends two or more liquids by combining them in layers in a continuous operation which is intermittent to the extent that after the formation of a predetermined number of layers that amount is dispensed and subsequent amounts are dispensed in like fashion. The method is that of mixing the layers of chemical substance and applying same.

Generally described, without restriction on the scope of my invention as defined in the appended claims, the method disclosed herein comprises intermittent mixture of two or more fluid substances, such as compounds containing isocyanates resin-foam material and a foam reactant, such as water and the catalyst, by depositing the respective separate materials in layers whereby there is a very thin layer of each material one on the top of the other to form a group of such layers made up of the alternating layers of the different materials and then removing and depositing that group of material to the surface to be treated and thereafter repeating the formation of groups of layers in like manner and depositing same as slowly or rapidly as desired to provide a distribution in the area to be treated. One form of the apparatus employed may be a portable or stationary applicator comprising a center core or rod which may be mounted in a stationary position and which has formed therein spaced condiuts to accommodate two or more substances that are to be mixed into a final mixture that is deposited on a surface or cavity to be treated. A portion of the rod is mounted within a cylindrical tube having a closed contact at opposite ends with the rod and being provided with end portions slanted to act as scrapers. A second sleeve or tube is mounted substantially over the first sleeve and being mounted to extend from the scraping end thereof to cover the scrapers and the end of the central rod. The openings or orifices for the fluids are spaced apart along the periphery of the rod and are inside of the end of the outermost sleeve so that material pumped or forced by pressure from the openings is deposited on the inside, cylindrical surface of the outer sleeve. The outer sleeve is mounted on bearings or otherwise suitably supported to rotate at any desired speed which for the purpose of explanation could be 1800 r.p.m. The inner sleeve is normally non-rotatable and therefore fixed from rotation with respect to the inner rod but being mounted for reciprocation a limited distance thereon to bring the scraper in from a position away from the discharge openings inside of the end of the other sleeve to a position covering the discharge openings and extending beyond the end of the outer sleeve to scrape the accumulated group of layers of materials therefrom. The inner sleeve may be reciprocated at any desired speed depending upon the frequency at which the accumulated material is to be discharged and for the sake of explanation this could be 100 strokes per minute. In the operation of the applicator, as the outer sleeve rotates fluid is pumped from the respective openings and since the openings are spaced equidistant, the substances that leave the openings are deposited in layers on top of each other. In the example given, 18 layers of alternating materials assuming that two materials are used, would be accumulated on the interior surface of the end of the outer sleeve before the reciprocating motion of the inner sleeve cuts off the flow of the liquid and scrapes and discharges the accumulated blended liquids from the end of the device. The application may be constant and therefore immediately upon the scraping of the material the inner sleeve returns to its original position, the flow of liquid resumes immediately and the rotation of the outer sleeve again accumulates the batch of material and the cycle is repeated 100 times in one minute in the example used.

An alternate modification of the device to accomplish this same purpose could be used to take care of those situations where the flow of materials is desired at a rate greater than could be provided in the arrangement previously described. This modified form or device would essentially reverse the relationship of the inner and outer sleeve and the accumulation of the liquid would by delivery from the stationary sleeve be deposited on the rapidly rotating inner rod from which the material is scraped by the reciprocating inner sleeve that is provided with scrapers against the inner rod rather than the inside of the outer sleeve.

An object of this invention is to provide a method for blending two ore more liquids in layers and discharging same at intervals in a continuous process.

A further object of this invention is to provide an applicator for applying two or more liquids to a surface on the applicator and then closing the discharge of the materials long enough to positively push the accumulated layers of material from the applicator and then repeating the same process rapidly in cycles.

Other and further objects and advantages of my invention will become apparent upon reading the following specification taken in conjunction with the accompanying drawings, in which.

Figure 1:
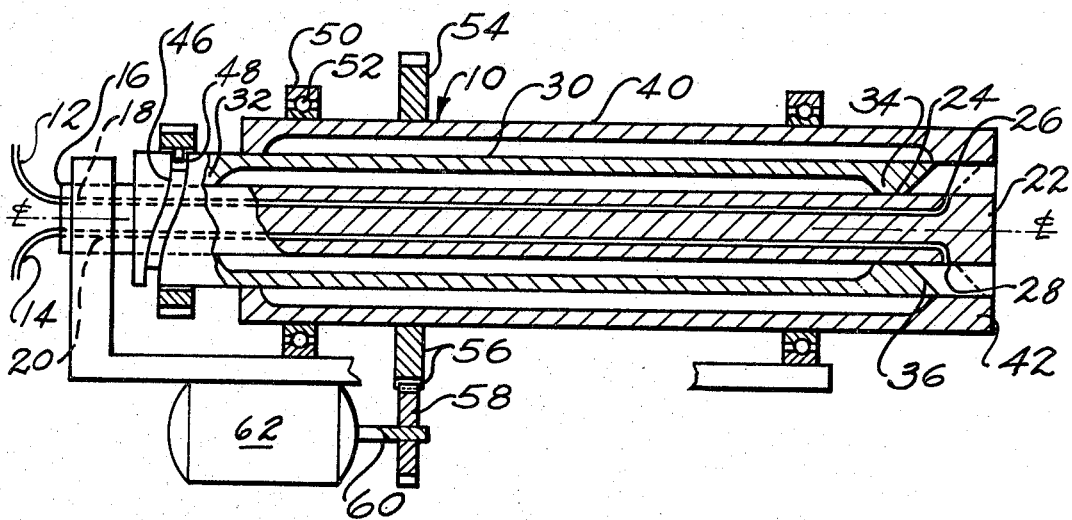
FIG. 1 is a substantially central, longitudinal cross-sectional view through one form of applicator nozzle which may be used to practice the present invention.

The applicator shown in FIG. 1 is identified generally by the reference numberal 10 which refers to the complete assembly. The device is somewhat nozzle-like in construction and operation and is supplied by means of two supply lines 12, 14 which when the device is used for mixing foam plastic materials would have a resin supplied through one of the lines 12 or 14 and the catalyst supplied through the other line. A solid rod-like member 16 has longitudinal passageways 18, 20 respectively to which is attached respectively one of the supply lines 12, 14 and through which the respective material is conducted along the length of the member 16 to the outward terminal end 22 thereof at which place on the periphery 24, of the member 16 is located a pair of spaced outlets 26, 28 each respectively corresponding with a respective passageway 18, 20 and from which outlets 26, 28 is delivered the particular substance being conveyed through the respective supply lines 12, 14.

For purposes of discussion and operation the center rod 16 may be considered as fixed and to this extent it may either be mounted on a holder (not shown) or to a gripping means (not shown) which may be carried in the hand or mounted on a holder. Accordingly, member 16 remains stationary and likewise supply lines 12, 14 are stationary therewith. Relative motion, however, between other parts is accomplished as described at this time.

A cylindrical sleeve member 30 of larger diameter in the middle portion than rod 16 diameter has reduced end portions 32, 34 forming closure, sliding bearing members in the form of cylindrical collars which are mounted on and may move relative to the periphery of rod 16. The front of sleeve 30 adjacent the end 22 of rod 16 is provided with a sloping outward end 36 forming scraping edges leading from the angular edge of the end of 34. Member 30 is mounted for limited movement on rod 16 from the position shown in the full lines in which position the openings 26, 28 are opened to the position shown in dotted lines in which position the end portion 34 has closed temporarily the openings 26, 28 thereby cutting off the flow momentarily from supply lines 12, 14 through respective longitudinal passageways 18, 20. At this time, any substance which has been discharged and accumulated in front of the leading edge of the scraper 36 will be pushed outwardly in the direction of the dotted lines shown in the drawings.

A second and larger sleeve or cylinder 40 is mounted over sleeve 30 and extends substantially the full length thereof being longer at the outward or front end 42 thereby to present on the interior cylindrical surface thereof an accumulation surface on the inner periphery on which substances pumped and delivered to the passageways 18, 20 and out through respective nozzles 26, 28 are deposited temporarily in this space and on this peripheral surface. The surface provides the collection area on which thin layers of material are deposited during the time that the substances delivered from passageways 18, 20 through respective nozzles 26, 28 are delivered to the collection area.

Sleeve 30 is provided at end 32 with a cam surface 46 operated by means of a complementary cam 48 that is driven rotatively to cause sleeve 30 to reciprocate with respect to the longitudinal center line C-L of the entire apparatus. Thus, member 32 reciprocates with respect to shaft 16 and in reciprocating moves from a position which is termed closed since the openings 26, 28 are momentarily closed to a position rearwardly thereof at which position the device is termed open and during this time substance is being emitted from the openings 26, 28 into the interior of sleeve 40.

Sleeve 40 is mounted for rotation. Bearing members 50 of conventional construction with ball bearings 52 support the sleeve 40 for rotation. A ring gear 54 mounted on sleeve 40 has teeth 56 which are driven by a pinion gear 58 mounted on a shaft 60 of an electric motor 62 which is attached to the mechanism in any suitable manner. Thus, motor 62 rotates sleeve 40 on sleeve 30. A typical example would be a speed of 1800 r.p.m. A typical reciprocation of sleeve 30 would be something in the nature of 100 strokes per minute. Thus, as sleeve 40 rotates 1800 r.p.m., innersleeve 30 reciprocates 100 strokes per minute. During this time, liquid is being forced or pumped through supply lines 12, 14 to nozzles 26, 28 and will emit therefrom at any time the nozzles are open and this is during the time that the sleeve 30 is in its normal retracted position.

To start a typical cycle, a liquid such as resin pumped through passageway 12 will emit from orifice 26 during the time that sleeve 30 is retracted and this substance will collect on the interior surface of sleeve 40 which is rotating. At the same time the substance such as a catalyst is being deposited on the other side of the interior of sleeve 40 as the sleeve rotates and since the sleeve 40 shifts position a resin which may be called R and then a catalyst which is identified as C will be deposited on top thereof each time the rotation takes place from one orifice on nozzle 26 to the other 28 and back to 26 again and so on.

Intermittently, and the revolving motion remains constant, in the present example eighteen layers of the alternating materials will be accumulated on the interior surface of the cylinder 40 at the end 22 before the next reciprocating motion of sleeve 30 causes the scraper edge at 36 to doff and to discharge or sluff the accumulated and blended resin and catalyst mixture layers from the end of the entire apparatus 10. Immediately upon the return of sleeve 30 to its initial position, the flow of resin R and catalyst C starts in and the cycle is repeated a hundred times in one minute in the present example.

It will be apparent to one skilled in the art that the amount of liquid deposited each time and the thickness of each layer with respect to each other layer is a function of both the speed of the cylinder 40 and the reciprocating speed of the cylinder 30. This is a variable which may be changed by changing the speed of either one of these members. Likewise, the respective size of the orifice or openings 28 is a variable which effects the total operation and may be varied by design to accomplish a given desired result. In any event, a layer of one substance—such as catalyst C—is being provided with a layer of the other substance—such as resin R—and a more homogeneous mixture is being accomplished than is possible by simple pour mixture, jet mixture or any other similar means of mixing two liquids. Since foam plastics set so fast after mixing, the present device is extremely advantageous for accomplishing a more homogeneous cross-section of foam in a given space than would be possible simply by mixing together two liquids and pouring same within the space.

Figure 2:
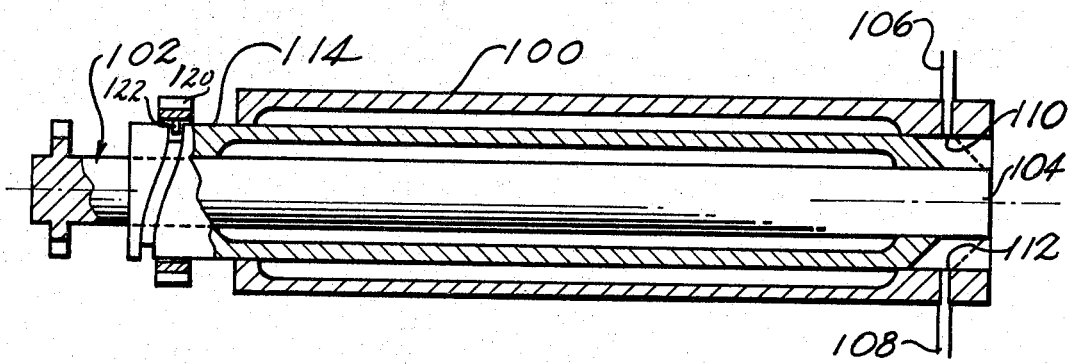
FIG. 2 is a cross-sectional view of a modified form of the apparatus shown in FIG. 1.

One modified form of the invention is shown in FIG. 2, wherein an outer sleeve 100 is stationary while an inner rod 102 reciprocates for example at 1800 r.p.m. The inner rod 102 is the accumulator device on its end 104 and the substances are fed through suply lines 106, 108 leaving nozzles 110, 112 on the inside of the cylinder 100. The doffing or removing cylinder 114 reciprocates in the manner of the previous embodiment in FIG. 1 and scrapes the substance from the surface of rod 102 rather than from the interior of cylinder 40 in the previous embodiment. In this particular embodiment, a greater flow could be accomplished than is practical with the FIG. 1 form. In the FIG. 2 embodiment, the substances can be introduced at a greater rate through the passages 106, 108 through the outer sleeve 100 onto the surface of the inner rod or rotating member 102.

In the embodiment of FIG. 2 a drive member 120 with cam actuator 22 is applied to operate inner member 114 to cause it to reciprocate during the time the material was being deposited and in this instance the substance would be spread along the rod 102 and if desired the holes 110, 112 could be placed closer together.

In the above noted discussion, mention was made of two substances for the sake of illustration; however, it is obvious that three or more substances may be fed through the devices in the same manner and the devices will blend any number of separate liquids.

In both the embodiments of FIG. 1 and FIG. 2, it is to be noted that as the respective members 30 and 114 move into position to remove that which is accumulated on the respective members 42 and 104, the surfaces of the respective members 30 and 114 move into position to close temporarily and momentarily the outlets of the respective openings 26, 28 in the embodiment of FIG. 1 and 108 and 110 in the embodiment of FIG. 2 thereby to prevent further accumulation or delivery of the materials to these outlets during the time that the removing operation is taking place.

While I have shown and described two embodiments of my invention, both having the same generic relationship, and one being in some respects a reversal of parts of the other, this is by way of illustration only and does not constitute a limitation on the scope of my invention since various alterations, deviations, changes eliminations, ramifications and variations may be made in the method and apparatus shown and described without departing from the scope of my invention as defined in the appended claims.

I claim:

1. A method for blending two or more substances which are supplied from separate supply sources to individual outlets comprising:
    (a) continuously moving an accumulation area in a repetitive cycle with respect and relative to the respective supply outlets thereby to cause the substances to come into contact with each other on the area and to be superposed alternately with each thereafter terminating the supply of substance momentarily while removing the accumulated material therefrom.

2. In a method for blending two or more substances which are supplied from separate sources through passageways,
    (a) delivering said substances separately onto a moving accumulation area which moves wtih respect to the respective supply outlet of said respective passageways thereby to cause the substances to come into contact with each other and blend on a moving surface and thereafter momentarily discontinuing the supply and temporarily closing the passageways while removing the accumulated material therefrom.

3. In a method for blending two or more substances which are supplied continuously from separate sources through passageways,
    (a) delivering said substances separately onto a rotating accumulation area that is rotating with respect to the supply outlet of said passageways thereby to cause the substances to come into contact and blend continuously on a rotating surface and thereafter closing said passageways momentarily while removing the accumulated material therefrom.

4. In a method for blending two or more liquids which are supplied from separate sources through closable passageways and that react with each other to cause a solid to form,
    (a) delivering said liquids separately onto a rotating accumulation area wtih respect to the supply outlet of said passageways thereby to cause the liquids to come into contact on a rotating surface and thereafter closing said passageways momentarily to halt the supply of said liquids while removing the accumulated material therefrom prior to reaction.

5. The method in claim 4 wherein said accumulated material is moved linearly when it is removed.

6. In a method for blending two or more substances which are supplied continuously from separate sources through passageways,
    (a) delivering said substances separately onto a rotating accumulation area that is rotating wtih respect to the supply outlet of said passageways thereby to cause the substances to come into contact and blend on a rotating surface and thereafter closing said passageways momentarily while removing the accumulated material therefrom.

7. In an apparatus for blending two or more substances which are supplied separately and wherein said substances should not be exposed to atmosphere or other conditions outside the apparatus until properly blended and wherein said blended substances should be removed promptly after blending,
    (a) a means having individual outlets for said substances,
    (b) a first collection means having a collection area moved successively adjacent the respective outlets to collect the respective substances delivered therefrom by travelling in succession from one outlet to the other in a repetitive cycle,
    (c) and a means for removing said collected substances.

8. In an apparatus for blending two or more substances which are supplied separately and wherein said substances should not be exposed to atmosphere or other conditions outside the apparatus until properly blended and wherein said blended substances should be removed promptly after blending,
    (a) a means having individual outlets for said substances,
    (b) a first collection means having continuous rotation and having a portion thereof adjacent the outlets to collect alternately and successively the substances delivered by traveling from adjacent one outlet to the other successively in a repetitive cycle,
    (c) and means for removing said substances collected on said collection means.

9. The device in claim 8 wherein said means in (c) reciprocates with respect to the collection means portion in (b) at intervals to remove the collected material.

10. In an apparatus for blending two or more substances which are supplied separately and wherein said substances should not be exposed to the air until blended and wherein said substances should be removed promptly to prevent clogging and the like,
    (a) a stationary member having passageways therein through which separate substances may be conducted and having respective outlets thereon,
    (b) a second member mounted for intermittent movement relative to said stationary member (a) and positioned to be over said outlets in one position of movement,
    (c) means for moving said member in (b) relative to said stationary member in (a),
    (d) and a third and continuously moving collection member mounted for motion relative to said members (a) and (b) and having a portion thereof adjacent to the outlets in said stationary member, thereby to collect alternately from said outlets to superpose the substances thereon.

11. In an apparatus for blending two or more substances which are supplied separately and wherein said substances should not be exposed to atmosphere or other conditions outside the apparatus until properly blended and wherein said blended substances should be removed promptly after blending,
    (a) a means having individual outlets for said substances,
    (b) a first member mounted for intermittent movement relative to said outlets and in a position of said intermittent movement being in position to close said outlets and to remove the blended substances,
    (c) means for moving said first member, in (b), (d) a second member mounted with said first member in (b) for continuous motion and having a portion thereof extending adjacent the outlets to collect the substances delivered therefrom between intermittent movements of said member in (b) by travelling from one outlet to the other successively in repetitive cycle, said first member being moved in place to remove the material collected by said second member, (e) and means for moving said second member (c) continuously with respect to said outlets.

12. The device in claim 11 wherein said first member in (b) is reciprocated in a straight line to remove and said second member in (d) rotated to collect.

13. The device in claim 12 wherein said first member in (b) is mounted on and coaxial with said collection member in (d).

14. The device in claim 13 wherein said first member in (b) is an elongated sleeve member and said second member in (d) is an elongated cylindrical member inside said sleeve member.

15. The device in claim 14 wherein said substances are delivered through a member that is mounted on and outside said members in (b) and (d).

16. In an apparatus for blending two or more substances which are supplied from separate supply lines and wherein said substances should not be exposed to the air until blended and wherein said blended liquids must be removed immediately, (a) a stationary cylindrical member having passageways therein through which separate substances may be conducted and having respective for said passageways on the inner peripheral surface of said member near one end, (b) an open member mounted for reciprocation inside said member in (a) and positioned to be close to said outlets in one position of reciprocation, (c) means for reciprocating said member in (b), (d) an inner member mounted in said reciprocating open member in (b) and having a collection portion thereof adjacent to the outlets from said passageways in said cylindrical member in (a) inner member, said inner member being rotated in said member (b) to collect and said member (b) moving intermittently to remove that which has been collected.

17. In an apparatus for blending two or more substances which are supplied separately and wherein said substances should not be exposed to atmosphere or other conditions outside the apparatus until properly blended and wherein said blended substances should be removed promptly after blending, (a) an outer member having individual outlets for said substances leading to the interior, (b) a first open member mounted for intermittent movement relative to said outlets inside said outer member and in one position of said intermittent movement being in position to close said outlets and to remove the blended substances, (c) means for moving said first member, in (b), (d) a second member mounted inside said member in (a) and member (b) for continuous motion and having a portion thereof extending adjacent the outlets in (a) to collect the substances delivered therefrom between intermittent movements of said member in (b) by travelling from one outlet to the other successively in repetitive cycle, said member (b) being moved in place to remove the material collected by said second member, (e) and means for moving said second member in (d) continuously with respect to said outlets.

References Cited
UNITED STATES PATENTS

| | | | |
|---|---|---|---|
| 3,008,696 | 11/1961 | Oldershaw et al. | 259—7 |
| 3,026,183 | 3/1962 | Cole | 259—7 X |
| 3,102,004 | 8/1963 | Grintz | 259—7 X |
| 3,131,910 | 5/1964 | Schrenk et al. | 259—3 |

WILLIAM I. PRICE, *Primary Examiner.*

WALTER A. SCHEEL, *Examiner.*

J. M. BELL, *Assistant Examiner.*